United States Patent
Inamoto et al.

(10) Patent No.: US 8,412,001 B2
(45) Date of Patent: Apr. 2, 2013

(54) IMAGE PROCESSING DEVICE, METHOD AND PROGRAM

(75) Inventors: Shinji Inamoto, Tokyo (JP); Kazumi Sato, Kanagawa (JP); Sadakazu Nagao, Tokyo (JP); Daisuke Ogata, Saitama (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 12/684,409

(22) Filed: Jan. 8, 2010

(65) Prior Publication Data

US 2010/0177976 A1    Jul. 15, 2010

(30) Foreign Application Priority Data

Jan. 9, 2009 (JP) ............................. P2009-003370

(51) Int. Cl.
  *G06K 9/32*    (2006.01)
(52) U.S. Cl. .................................................... 382/299
(58) Field of Classification Search .................. 382/240, 382/298, 299, 305
  See application file for complete search history.

(56) References Cited

U.S. PATENT DOCUMENTS 5,029,228 A * 7/1991 Nonoyama et al. ............ 382/305
6,005,679 A * 12/1999 Haneda ......................... 358/453

FOREIGN PATENT DOCUMENTS

| JP | 11-017931 | 1/1999 |
| JP | 2002-094782 | 3/2002 |
| JP | 2006-050090 | 2/2006 |
| JP | 2007-86432 | 4/2007 |

* cited by examiner

*Primary Examiner* — Phuoc Tran
(74) *Attorney, Agent, or Firm* — Finnegan, Henderson, Farabow, Garrett & Dunner, L.L.P.

(57) ABSTRACT

In an image processing device, a transfer unit enlarges or reduces the image data at the transfer magnification by performing an enlarging or reducing process on the image data once, when the transfer magnification is equal to or smaller than an upper limit or equal to or greater than a lower limit. The transfer unit also repeats, by a plurality of times, a process of performing an enlarging or reducing process on an image data stored in a first region of a storage unit at a divided-transfer magnification equal to or smaller than the upper limit or equal to or greater than the lower limit and then storing the image data in a second region of the storage unit, when the transfer magnification is above the upper limit or below the lower limit.

11 Claims, 6 Drawing Sheets

IMAGE PROCESSING DEVICE, METHOD AND PROGRAM

BACKGROUND OF THE INVENTION

1. Field of the Invention

The present invention relates to image processing devices, methods, and programs and, in particular, to image processing devices, methods, and programs capable of image transfer after an enlarging process at a transfer magnification above an upper limit and after a reducing process at a transfer magnification below a lower limit.

2. Description of the Related Art

In recent years, resolution of devices such as digital cameras has been increasing. Accordingly, resolution of images handled by each of these devices has also been increasing. For this reason, each device often includes an image processing device that transfers image data subjected to an enlarging or reducing process (for example, refer to Japanese Unexamined Patent Application Publication No. 2007-86432). For image processing devices of this type, it is desirable to achieve a reducing process at a lower transfer magnification and an enlarging process at a higher transfer magnification.

SUMMARY OF THE INVENTION

However, the related art, such as the one disclosed in Japanese Unexamined Patent Application Publication No. 2007-86432 mentioned above, is inadequate to achieve these processes because the image processing device has upper and lower limits of transfer magnification. That is, the enlarging and reducing processes by the image processing device are not sufficient for performing an enlarging process at a transfer magnification above the upper limit and a reducing process at a transfer magnification below the lower limit.

It is desirable to perform an enlarging process at a transfer magnification above an upper limit of an image processing device and to perform a reducing process at a transfer magnification below a lower limit before images are transferred.

An image processing device according to an embodiment of the present invention includes storage means for storing image data and transfer means for enlarging or reducing the image data stored in a first region of the storage means at a predetermined transfer magnification and transferring the image data to a second region other than the first region of the storage means. The transfer means enlarges or reduces the image data at the predetermined transfer magnification by performing an enlarging or reducing process on the image data once, when the predetermined transfer magnification is equal to or smaller than a predetermined upper-limit threshold or equal to or greater than a predetermined lower-limit threshold; the transfer means also enlarges or reduces the image data at the predetermined transfer magnification by repeating, by a plurality of times, a divided-transfer process of performing an enlarging or reducing process on the image data at a divided-transfer magnification equal to or smaller than the upper-limit threshold or equal to or greater than the lower-limit threshold and then storing the image data in the second region of the storage means, when the predetermined transfer magnification is above the upper-limit threshold or below the lower-limit threshold.

The transfer means determines the number of times n the divided-transfer process is repeated (n is an integer equal to or greater than 2) and the divided-transfer magnification in the divided-transfer process to be performed for each of the n times, based on the predetermined transfer magnification and the upper-limit threshold or the lower-limit threshold.

The transfer means further determines the number of times n the divided-transfer process is repeated and the divided-transfer magnification in the divided-transfer process to be performed for each of the n times, based on properties of hardware of the image processing device.

The transfer means further determines the number of times n the divided-transfer process is repeated and the divided-transfer magnification in the divided-transfer process to be performed for each of the n times, based on image quality of an image corresponding to the image data.

The transfer means determines the divided-transfer magnification so as to equally distribute the predetermined transfer magnification to the divided-transfer process to be performed for each of the n times.

The transfer means determines the divided-transfer magnification of the divided-transfer process to be performed for each of the n times as being equal to 1/natural number.

The upper-limit threshold is an upper limit of transfer magnification due to restrictions of hardware of the image processing device, and the lower-limit threshold is a lower limit of transfer magnification due to the restrictions of the hardware of the image processing device.

The transfer means further performs a process that causes deterioration of an image corresponding to the image data when performing a reducing process at a transfer magnification below a specific value, and the lower-limit threshold is the specific value.

An image processing method and program according to another embodiment of the present invention correspond to the image processing device according to the above-described embodiment of the present invention.

In the image processing device, method, and program according to the above-described embodiments of the present invention, in an image processing device or the like including storage means for storing image data and transfer means for enlarging or reducing the image data stored in a first region of the storage means at a predetermined transfer magnification and transferring the image data to a second region other than the first region of the storage means, processes described below are performed. That is, when the predetermined transfer magnification is equal to or smaller than a predetermined upper-limit threshold or equal to or greater than a predetermined lower-limit threshold, the image data is enlarged or reduced at the predetermined transfer magnification by performing an enlarging or reducing process on the image data once. On the other hand, when the predetermined transfer magnification is above the upper-limit threshold or below the lower-limit threshold, the image data are enlarged or reduced at the predetermined transfer magnification by repeating, by a plurality of times, a divided-transfer process of performing an enlarging or reducing process on the image data at a divided-transfer magnification equal to or smaller than the upper-limit threshold or equal to or greater than the lower-limit threshold and then storing the image data in the second region of the storage means.

According to the above embodiment of the present invention, an enlarging process at a transfer magnification above the upper limit of the image processing device and a reducing process at a transfer magnification below the lower limit thereof can be performed for image transfer.

DESCRIPTION OF THE PREFERRED EMBODIMENTS

Figure 1:
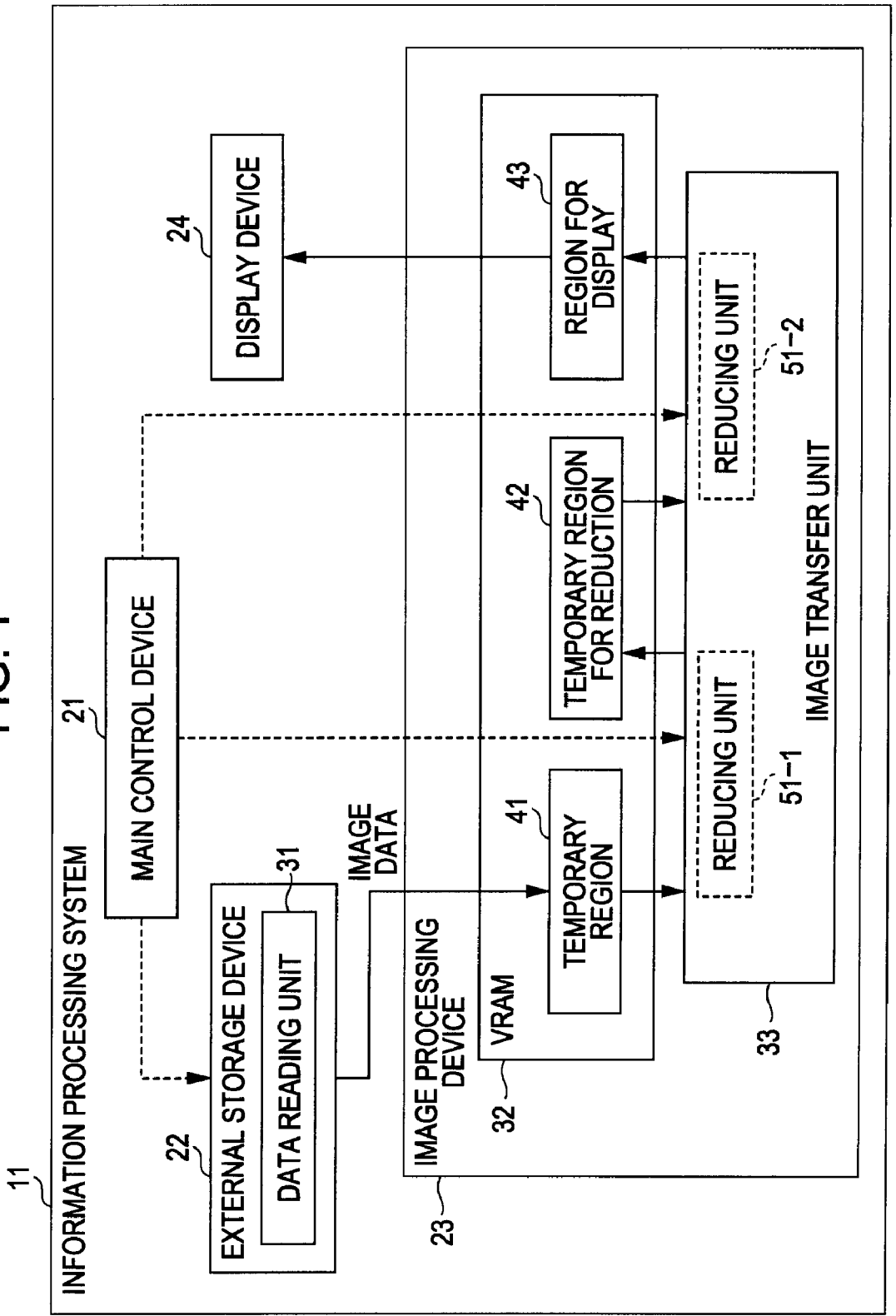
FIG. 1 is a functional block diagram depicting an example of the functional structure of an information processing system according to an embodiment of the present invention.

1. General Outline of Embodiments of the Present Invention

Image processing devices that transfer image data have upper and lower limits of transfer magnification. If an image processing device of this type is used as it is, it is difficult to perform an enlarging process at a transfer magnification above the upper limit and a reducing process at a transfer magnification below the lower limit. Some image processing devices may cause deterioration in image quality at the time of a reducing process by, for example, reducing pixels when the transfer magnification of image data is below a specific value. Also, an enlarging process at a transfer magnification above the upper limit and a reducing process at a transfer magnification below the lower limit may be handled by hardware of an image processing device. However, such handling may cost high. Moreover, depending on the handling, the transfer magnification may not be sufficiently decreased. Furthermore, the lower limit of transfer magnification may be under constraints on a device where the image processing device is equipped, and therefore the above-described handling may be difficult.

Thus, the inventors have devised a technique of dividing an image-data enlarging or reducing process of an image processing device 23 into a plurality of processes. By applying this technique, an enlarging process at a transfer magnification above an upper limit of the image processing device 23 and a reducing process at a transfer magnification below a lower limit thereof can be performed. Also, in the case where image quality may deteriorate at the time of a reducing process due to, for example, reduction of pixels, when the transfer magnification of image data is below a specific value, it is possible to perform a reducing process kept at the specific transfer magnification below which image quality may deteriorate.

With reference to the drawings, image processing devices according to two embodiments of the present invention are described below.

In the embodiments below, an image-data reducing process is described. However, the embodiments of the present invention can be easily applied not only to a reducing process but also an enlarging process based on a similar concept.

The information processing system according to an embodiment performs an enlarging process at a transfer magnification above the upper limit of the image processing device and a reducing process at a transfer magnification below the lower limit thereof, thereby allowing image transfer.

The information processing system according to another embodiment addresses a case in which image quality may deteriorate at the time of a reducing process due to, for example, reduction of pixels, when the transfer magnification of image data is below a specific value. In this case, the information processing system according to the other embodiment performs a reducing process kept at the specific transfer magnification below which image quality may deteriorate, thereby allowing image transfer.

2. Information Processing System According to an Embodiment of the Present Invention Example of Structure of the Information Processing System FIG. 1 is a functional block diagram depicting an example of the functional structure of an information processing system according to an embodiment of the present invention.

Here, the system refers to an entire apparatus configured of a plurality of devices and processing units. That is, an information processing system 11 in the example of FIG. 1 can be recognized as one entire information processing device or can be recognized as being configured of a plurality of devices.

The information processing system 11 in the example of FIG. 1 includes a main control device 21 including a central processing unit (CPU), an external storage device 22, the image processing device 23, and a display device 24.

The external storage device 22 is provided with a data reading unit 31. The image processing device 23 is provided a video random access memory (VRAM) 32 and an image transfer unit 33. The VRAM 32 includes a temporary region 41, a temporary region for reduction 42, and a region for display 43. The image transfer unit 33 is provided with reducing units 51-1 and 51-2.

General Outline of Operation Example of the Information Processing System

The main control device 21 controls the operation of the entire information processing system 11.

For example, the main control device 21 instructs the external storage device 22 to read image data into the temporary region 41 of the VRAM 32. The data reading unit 31 of the external storage device 22 then reads the image data from the external storage device 22 into the temporary region 41 of the image processing device 23. In the present embodiment, it is assumed that data in a format displayable on the display device 24 without decoding is adopted as image data.

Also, for example, the main control device 21 instructs the reducing unit 51-1 of the image transfer unit 33 to reduce the image data read into the temporary region 41 and store the reduced data in the temporary region for reduction 42. The reducing unit 51-1 then obtains the image data from the temporary region 41, and then performs a reducing process on that image data. The reducing unit 51-1 then temporarily stores the image data reduced by the reducing process in the temporary region for reduction 42.

Furthermore, for example, the main control device 21 instructs the reducing unit 51-2 to reduce the image data stored in the temporary region for reduction 42 and store the reduced data in the region for display 43. The reducing unit 51-2 then obtains the image data from the temporary region for reduction 42, and then performs a reducing process on that image data. The reducing unit 51-2 then temporarily stores the image data reduced by the reducing process in the region for display 43.

The image data stored in the region for display 43 is then transferred to the display device 24.

The display device 24 then displays an image corresponding to the image data transferred from the region for display 43.

In the example of FIG. 1, the image-data reducing process by the image transfer unit 33 of the image processing device 23 is divided into two, thereby preventing the transfer magnification of each reducing process from being below the lower limit of the transfer magnification of the image processing device 23 (the image transfer unit 33).

However, when the original transfer magnification is equal to or greater than the lower limit of the transfer magnification of the image processing device 23 (the image transfer unit 33), the image-data reducing process may not necessarily be divided into a plurality of processes. In this case, the reducing unit 51-1 can store the image data reduced by the reducing process not in the temporary region for reduction 42 but in the region for display 43.

Furthermore, conversely, there may be a case in which the transfer magnification in each reducing process is below the lower limit of the transfer magnification of the image processing device 23 (the image transfer unit 33) even by dividing the image-data reducing process of the image transfer unit 33 into two. In this case, the reducing process of the image transfer unit 33 is divided into three or more, thereby preventing the transfer magnification of each reducing process from being below the lower limit of the transfer magnification of the image processing device 23 (the image transfer unit 33).

That is, in this case, in the image processing device 23, the VRAM 32 is provided with two or more temporary regions for reduction 42, and the image transfer unit 33 is provided with reducing units 51-1 to 51-n (n is an integer indicative of the number of times the reducing process is performed).

The reducing unit 51-1 obtains image data from the temporary region 41, and then performs a reducing process on that image data. The reducing unit 51-1 then temporarily stores the image data reduced by the reducing process in one of two or more temporary regions for reduction 42.

Each of the reducing units 51-2 to 51-(n−1) obtains image data from one of two or more temporary regions for reduction 42, and then performs a reducing process on that image data. Each of the reducing units 51-2 to 51-(n−1) then temporarily stores the image data reduced by the reducing process in the other one of these two or more temporary regions for reduction 42.

The reducing unit 51-n obtains image data from the temporary region for reduction 42, and then performs a reducing process on that image data. The reducing unit 51-2 then temporarily stores the image data reduced by the reducing process in the region for display 43.

Furthermore, with reference to FIG. 2 onward, an image-data reducing process by the image processing device 23 is described below.

Figure 2:
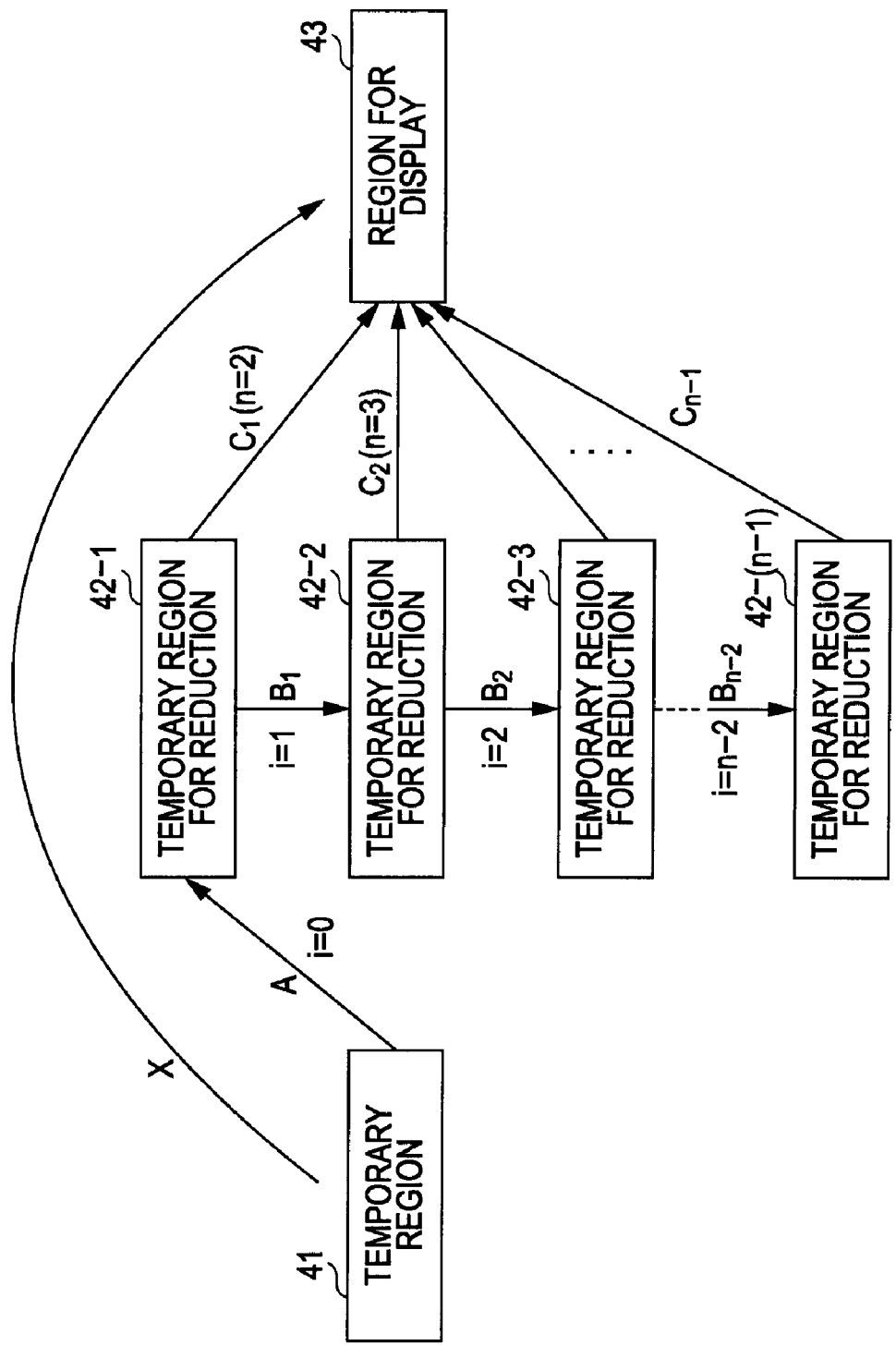
FIG. 2 illustrates a general outline of an image-data reducing process by an image processing device of the information processing system depicted in FIG. 1.

FIG. 2 is a diagram illustrating a general outline of an image-data reducing process by the image processing device 23.

In the example of FIG. 2, the VRAM 32 of the image processing device 23 is provided with the temporary region 41, n−1 (n is an integer indicative of the number of times the reducing process is performed, as described above) temporary regions for reduction 42-1 to 42-(n−1), and the region for display 43. Here, even when three or more reducing processes are performed, the number of temporary regions for reduction 42 is not restricted to n−1 in the example of FIG. 2, and can be arbitrary as long as it is equal to or greater than 2. This is because at least two temporary regions for reduction 42 are sufficient, with repetition of overwrite.

A transfer magnification for transfer from the temporary region 41 to the region for display 43 is represented as X (X is a value smaller than 1) below, in accordance with the details in FIG. 2. That is, the transfer magnification X indicates an original transfer magnification for transfer from the image processing device 23 to the display device 24. Also, a lower limit of transfer magnification of the image processing device 23 (as hardware) is represented as Y (Y is a value smaller than 1).

In this case, with the transfer magnification X and the lower limit Y defined, the number of times n the reducing process is performed is determined.

When the number of times n the reducing process is performed is equal to or greater than 2, that is, when the reducing process is divided into a plurality of processes, a transfer magnification for transfer from the temporary region 41 to the temporary region for reduction 42-1 is represented as A. That is, the transfer magnification A is the one for application when the reducing unit 51-1 reduces the image data obtained from the temporary region 41 and stores the reduced data in the temporary region for reduction 42-1.

Also, a transfer magnification at the temporary region for reduction 42-i (i is an integer from 1 to n−2) is represented as $B_i$ below. That is, when the transfer magnification of each reducing process is below the lower limit Y of transfer magnification of the image processing device 23, the number of times n the reducing process is performed by the reducing units 51-1 to 51-n is increased to adjust the transfer magnification of each reducing process. That is, a transfer magnification of the reducing unit 51-2 is represented as $B_1$, a transfer magnification of the reducing unit 51-3 is represented as $B_2$, . . . , and a transfer magnification of the reducing unit 51-(n−1) is represented as $B_{n-2}$.

Furthermore, a transfer magnification for transfer from the temporary region for reduction 42-n to the region for display 43 is represented as $C_{n-1}$ below. That is, the transfer magnification $C_{n-1}$ is the one when the image processing device 23 reduces the image data stored in the temporary region for reduction 42 and stores the reduced data in the region for display 43.

In this case, regarding the transfer magnification of each reducing process, a relation in Equation (1) below holds.

$$X = A \times C_1 = A \times B_1 \times C_2 = \ldots A \times B_1 \times B_2 \times \ldots \times B_{n-2} \times C_{n-1} \quad (1)$$

Here, in Equation (1), any of the transfer magnifications A, $B_1$, and $C_{n-1}$ is assumed to be equal to or greater than the lower limit Y of transfer magnification of the image processing device 23.

The transfer magnifications A, $B_i$, and $C_{n-1}$ are not uniquely defined only from the above Equation (1). Thus, before reducing and transferring the image data, the image processing device 23 previously performs a process of determining these transfer magnifications A, $B_i$, and $C_{n-1}$ (the process is referred to below as a transfer-magnification determining process).

Here, the transfer-magnification determining technique itself can be arbitrary as long as it satisfies Equation (1). However, the transfer magnifications A, $B_i$, and $C_{n-1}$ have an influence on the amount of memory used and transfer time of the temporary region for reduction 42, and also on image quality, depending on the device adopted as the information processing system 11. When the image processing device 23 according to the present embodiment is applied, priorities and properties of the information processing system 11 vary, depending on circumstances. Therefore, it is difficult to generalize how and what transfer magnifications A, $B_1$, and $C_{n-1}$ are set. That is, preferred transfer-magnification determining techniques vary depending on priorities and properties of the information processing system 11. Thus, in this specification, several priority conditions are previously set, and transfer-magnification determining techniques suitable for these conditions are described as specific examples, which will be described further below.

Details of Operation Example of the Information Processing System

The operation example of the information processing system described above is now more detailed below. Here, a series of processes in which the information processing system reduces image data, transfers the reduced image data to the display device 24, and then causes an image corresponding to the image data to be displayed on the display device 24 is referred to as an image-data transfer process.

Figure 3:
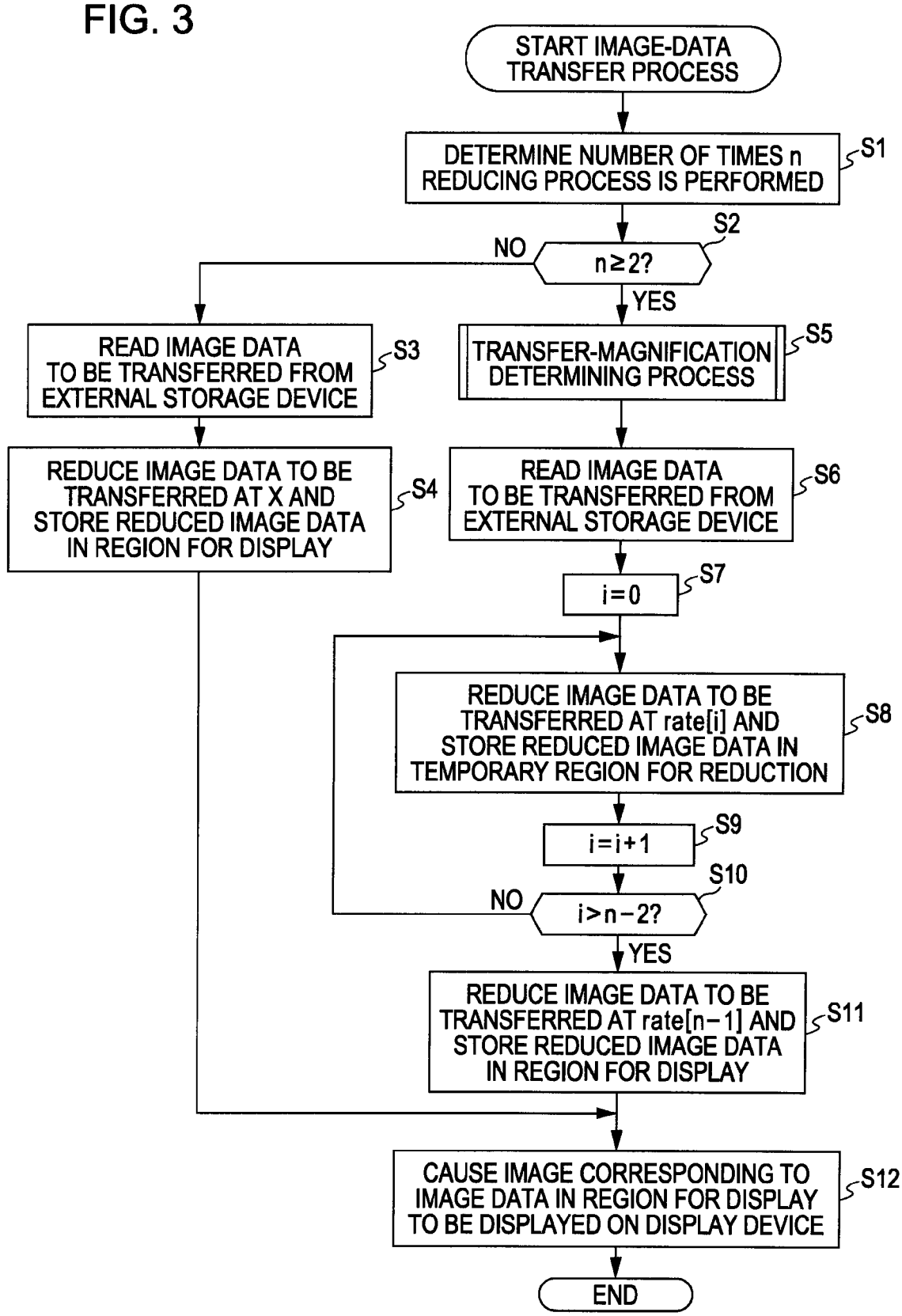
FIG. 3 is a flowchart illustrating an example of an image-data transfer process to be performed by the image processing device of the image processing system depicted in FIG. 1.

FIG. 3 is a flowchart illustrating an example of the image-data transfer process.

In the description below, the image-data transfer process is assumed to be performed by the image transfer unit 33 of the image processing device 23 under the control of the main control device 21. However, at least part of the image-data transfer process may be performed by a unit or device other than the image transfer unit 33, for example, the main control device 21.

At step S1, the image transfer unit 33 determines the number of times n the reducing process is performed.

Specifically, for example, the number of times n the reducing process is performed is determined so as to satisfy, for example, Equation (2) below.

$$Y^n \leq X < Y^{n-1} \tag{2}$$

At step S2, the image transfer unit 33 determines whether $n \geq 2$. When the number of times n the reducing process is performed is 1, it is avoidable to divide the image-data reducing process into a plurality of processes.

That is, when the number of times n is 1, the result is determined to be No at step S2, and the procedure then goes to step S3.

At step S3, the image transfer unit 33 reads image data to be transferred from the external storage device 22 into the temporary region 41.

At step S4, the reducing unit 51-1 of the image transfer unit 33 obtains the image data to be transferred from the temporary region 41, reduces the image data to be transferred at the original transfer magnification X, and then stores the reduced image data in the region for display 43.

At step S12, the image transfer unit 33 transfers the image data from the region for display 43 to the display device 24, thereby causing an image corresponding to that image data to be displayed on the display device 24.

The image-data transfer process then ends.

In contrast to the processing when the number of times n the reducing process is performed is 1, the processing when the number of times n is $n \geq 2$ is described below.

That is, in this case, the result is determined to be Yes at step S2, and the procedure then goes to step S5.

At step S5, the image transfer unit 33 performs a transfer-magnification determining process. The transfer magnifications A, $B_i$, and $C_{n-1}$ are then determined. Specific examples of the transfer-magnification determining process are described further below.

The transfer magnification A is referred to below as rate[0] as appropriate. The transfer magnification $B_i$ (i=1 to n−2) is referred to below as rate[i] as appropriate. Also, the transfer magnification $C_{n-1}$ is referred to below as rate[n−1] as appropriate. That is, in the transfer-magnification determining process at step S5, when n transfer magnifications rate[0], rate[i], and rate[n−1] (=A, $B_i$, $C_{n-1}$) are determined, the procedure goes to step S7.

At step S7, the image transfer unit 33 sets i=0.

At step S8, the reducing unit 51-(i+1) of the image transfer unit 33 reduces the image data to be transferred at rate[i], and then stores the reduced image data in the temporary region for reduction 42.

When the number of times n the reducing process is performed is $n \leq 3$, as described above, there are two or more temporary regions for reduction 42. Thus, the reducing unit 51-(i+1) obtains image data to be transferred from one of these two or more temporary regions for reduction 42, and reduces that image data to be transferred at rate[i] (A where i=0 and $B_i$ where i=1 to n−2). The reducing unit 51-(i+1) then temporarily stores the image data that has been reduced at rate[i] and is to be transferred in the other one of these two or more temporary regions for reduction 42.

At step S9, the image transfer unit 33 increments i by 1 (i=i+1).

At step S10, the image transfer unit 33 determines whether i>n−2.

When i is any one of 1 to n−2, the result is determined to be No at step S10, and the procedure returns to step S8, repeating processes onward.

That is, the processes at step S8 to S10 are repeatedly performed, thereby performing a reducing process n−1 times on the image data to be transferred. Then, when i=n−2, in the process at step S8, the image data to be transferred subjected to the reducing process n−1 times is stored in the temporary region for reduction 42. When i=n−1 in the process at step S9, the result is determined to be Yes in the process at step S10, and the procedure goes to step S11.

At step S11, the reducing unit 51-n of the image transfer unit 33 obtains the image data to be transferred from the temporary region for reduction 42, reduces the obtained image data at rate[n−1] (=$C_{n-1}$), and then stores the reduced data in the region for display 43.

At step S12, the image transfer unit 33 transfers the image data in the region for display 43 to the display device 24, thereby causing an image corresponding to that image data to be displayed on the display device 24.

The image-data transfer process then ends.

First Specific Example of Transfer-Magnification Determining Process

Next, several specific examples of the transfer-magnification determining process at step S5, in other words, examples of the transfer-magnification determining technique, are described.

Here, as described above, several priority conditions are previously set, and transfer-magnification determining techniques suitable for these priority conditions are described as specific examples.

In a first specific example, it is assumed that a priority condition that reduction in the amount of memory used in the temporary region for reduction 42 and reduction in transfer time are prioritized is adopted.

In this case, if the transfer magnifications (A, $B_i$, $C_{n-1}$) of earlier ones of the processes obtained by dividing the reducing process into a plurality of processes are set to smaller values, the size of the image data to be transferred in the earlier processes is smaller. As a result, reduction in the amount of memory used in the temporary region for reduction 42 and reduction in transfer time can be expected.

When the number of times n the reducing process is performed is 2, the transfer magnification is determined as represented in Equation (3).

$$A = Y$$

$$C_1 = X/Y \tag{3}$$

When the number of times n is $n \geq 3$, the transfer magnification is determined as represented in Equation (4).

$$A = Y$$

$$B_i = Y \text{ (i is an integer from 1 to n−2)}$$

$$C_{n-1} = X/Y^{n-1} \tag{4}$$

Second Specific Example of Transfer-Magnification Determining Process

In a second specific example, it is assumed that a priority condition that high image quality is a top priority is adopted.

The setting of the transfer magnification for improving image quality depends on the information processing system 11. Therefore, several properties regarding image quality of the information processing system 11 are assumed to individually describe second to fourth specific examples in sequence.

First, in the second specific example, it is assumed that image quality is improved when the transfer magnification for an earlier one of the processes obtained by dividing the reducing process into a plurality of processes is set to a higher value.

When the number of times n the reducing process is performed is 2, the transfer magnification is determined as represented in Equation (5) below.

$A = X/Y$ $C_{n-1} = Y$ (5)

When the number of times n is n≧3, the transfer magnification is determined as represented in Equation (6) below.

$A = X/Y^{n-1}$ $B_i = Y$ (i is an integer from 1 to n-2)

$C_{n-1} = Y$ (6)

Third Specific Example of Transfer-Magnification Determining Process

As with the second specific example, it is assumed in the third specific example that a priority condition that high image quality is a top priority is adopted.

However, in the third specific example, it is also assumed that image quality is improved when a difference in transfer magnification between reducing processes is small.

When the number of times n the reducing process is performed is 2, the transfer magnification is determined as represented in Equation (7) below.

$A = X^{1/2}$ $C_1 = X^{1/2}$ (7)

When the number of times n is nn, the transfer magnification is determined as represented in Equation (8) below.

$A = X^{1/n}$ $B_i X^{1/n}$ (i is an integer from 1 to n-2)

$C_{n-1} X^{1/n}$ (8)

Fourth Specific Example of Transfer-Magnification Determining Process

As with the second and third specific examples, it is assumed in the fourth specific example that a priority condition that high image quality is a top priority is adopted.

However, in the fourth specific example, it is also assumed that image quality is improved when the number of reducing processes with a transfer magnification of 1/k (k is a natural number) is more.

In the fourth specific example, the technique of calculating a transfer magnification is complex, compared with the other specific examples. Therefore, the fourth specific example is described with reference to the flowcharts depicted in FIGS. 4 and 5.

Figure 4:
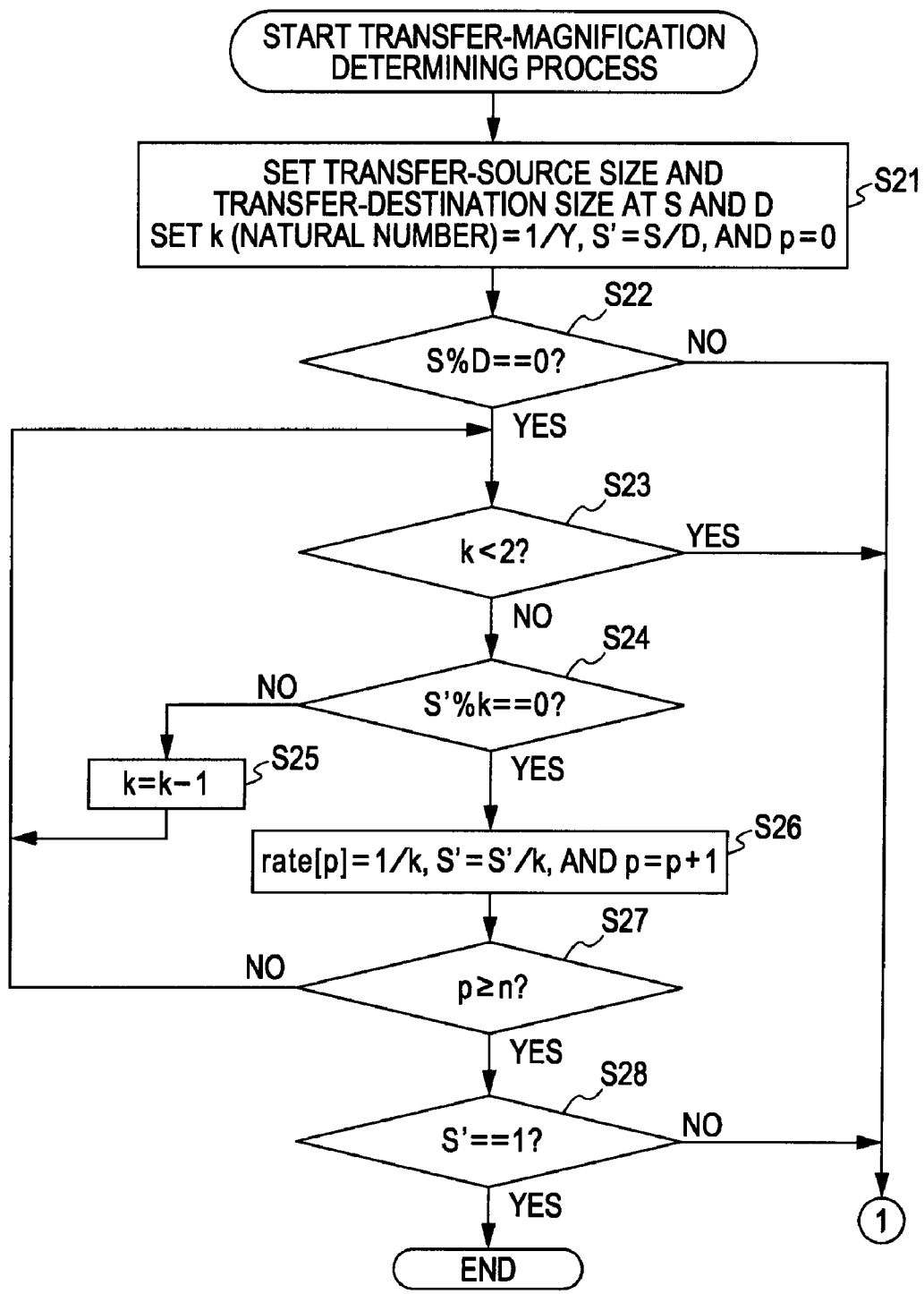
FIG. 4 is a flowchart illustrating a detailed example of a transfer-magnification determining process at step S5 of the image-data transfer process in FIG. 3.
Figure 5:
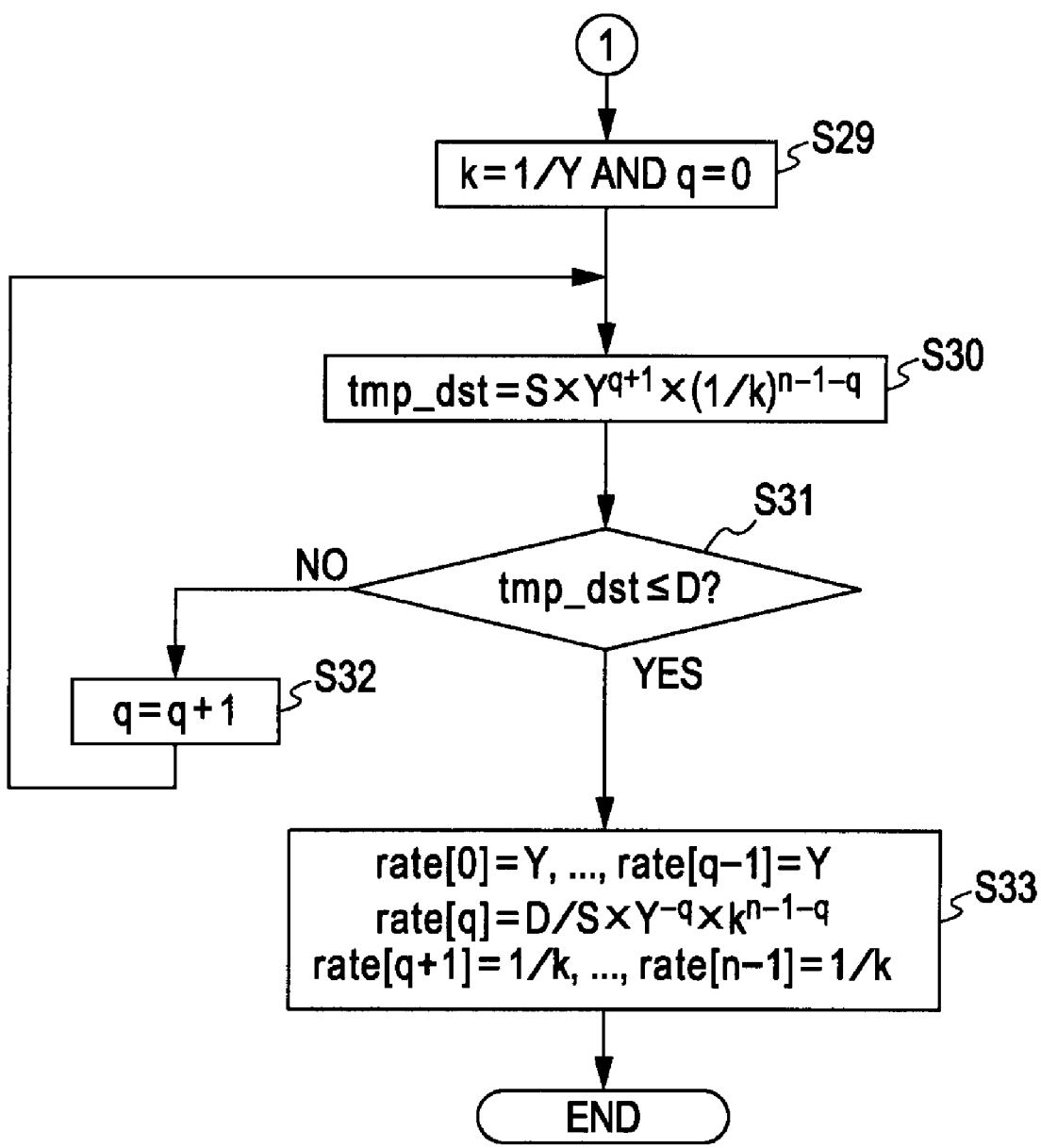
FIG. 5 is a flowchart illustrating the detailed example of the transfer-magnification determining process at step S5 of the image-data transfer process in FIG. 3.

FIGS. 4 and 5 are flowcharts illustrating the fourth specific example of the detailed examples of the transfer-magnification determining process at step S5 in FIG. 3.

In the transfer-magnification determining process in FIGS. 4 and 5, a general outline of the processing depicted in FIG. 4 is described below. That is, for the processes obtained by dividing the reducing process into a plurality of processes, it is checked whether all transfer magnifications (A, $B_i$, $C_{n-1}$) can be made 1/k. This check can be performed by checking whether the original transfer magnification X is represented as the product of n 1/k (where k, which is a common denominator of each fraction, may or may not be the same). Also, in the processing depicted in FIG. 4, when the original transfer magnification X is represented as the product of n1/k, each of these transfer magnifications (A, $B_i$, $C_{n-1}$) is calculated. On the other hand, when the original transfer magnification X is not represented as the product of n 1/k, the processing depicted in FIG. 5 is performed, which is described next.

In the transfer-magnification determining process depicted in FIGS. 4 and 5, a general outline of the processing depicted in FIG. 5 is described below. That is, each of the transfer magnifications (A, $B_i$, $C_{n-1}$) is calculated so that more transfer magnifications (A, $B_i$, $C_{n-1}$) of the processes obtained by dividing the reducing process into a plurality of processes are represented as 1/k.

First, of the transfer-magnification determining process depicted in FIGS. 4 and 5, the processing depicted in FIG. 4 is described.

When the transfer magnification X is represented as the product of n 1/k, relations 1 to 3 below hold. Here, transfer-source image data has a size S (a size to be read in the temporary region 41), and the transfer-destination image data has a size D (a size stored in the region for display 43). Also, $\alpha\beta\equiv\gamma$ indicates that γ is the reminder when α is divided by β.

Relation 1: SD≡0

Relation 2: {S/D} can be represented as the product of n positive integers (integers taken as k)

Relation 3: each positive integer (integer taken as k)≦1/Y

A process of checking whether these relations 1 to 3 are satisfied is performed as processing depicted in FIG. 4.

That is, at step S21, the image transfer unit 33 sets a transfer-source size and a transfer-destination size at S and D, respectively. The image transfer unit 33 also sets k (natural number)=1/Y (the fractional part is dropped) and S'=S/D, and p=0, where p indicates a number when the transfer magnification is represented as rate[p]. However, as will be described below, note that the transfer magnification rate[p] is basically independent from the transfer magnification rate[i] in FIG. 3.

Specifically, when the lower limit Y of the transfer magnification of the image processing device 23 (as hardware) is, for example, 1/3.975, it is possible to set ⅓ as the transfer magnification rate[p] of each process obtained by dividing the reducing process into a plurality of processes, but not possible to set ¼. Thus, in this case, 1/Y=3.975. With its fractional part dropped, k=3 (=1/Y) is set.

At step S22, the image transfer unit 33 determines whether SD≡0, that is, whether Relation 1 holds.

When S divided by D leaves the reminder not 0, that is, when Relation 1 does not hold, the numerator is not 1 even if D/S is reduced to its lowest terms. Thus, the transfer magnification X is not represented as the product of 1/k. In this case, that is, when Relation 1 does not hold, the result is determined to be No at step S22, and the procedure then goes to step S29 in FIG. 5. That is, the processing depicted in FIG. 5 is performed, which will be described further below.

On the other hand, when S divided by D leaves the remainder 0, that is, when Relation 1 holds, the result is determined to be Yes at step S22, and the procedure then goes to step S23.

At step S23, the image transfer unit 33 determines whether k<2.

When k<2, the transfer magnification X is not represented as the product of 1/k. In this case, the result is determined to be Yes at step S23, and the procedure then goes to step S29 in FIG. 5. That is, the process depicted in FIG. 5 is performed, which will be described further below.

On the other hand, when k≧2, the result is determined to be No at step S23, and the procedure then goes to step S24.

At step S24, the image transfer unit 33 determines whether S'%k==0.

When S' divided by currently-set k produces a non-0 reminder, the currently-set k is not a positive integer satisfying Relation 2. That is, the transfer magnification X is not represented by the product of 1/k (where k includes at least the currently-set positive integer). Thus, in this case, the result is determined to be No at step S24 so as to change the setting of k, and the procedure then goes to step S25. At step S25, the image transfer unit 33 decrements k by 1 (k=k−1). Here, decrementing k by 1 for update is to satisfy Relation 3. Specifically, for example, in the above-described example, k=3 is set in the process at step S21, and therefore k=2 is set in the process at step S25. When the process at step S25 ends, the process returns to step S23, repeating the processes thereafter.

When k set in the process at step S21 or updated in the process at steps S23 to S25 becomes a value that gives the remainder 0 when dividing S', the result is determined to be Yes in the process at step S24, and the procedure then goes to step S26.

At step S26, the image transfer unit 33 sets rate[p]=1/k and S'=S'/k. Here, k indicates a value set when the result is determined to be Yes in the process at step S24. The image transfer unit 33 also increments p by 1 (p=p+1).

Specifically, for example, when k=3 is set in the process at step S21 and the result is determined to be Yes in the process at step S24, rate[p] is ⅓. Also, for example, when k=3 is set, the result is determined to be No in the process at step S24 for update to k=2 in the process at the next step S25, and then the result is determined to be Yes in the process at the next step S24, rate[p] is ½. When k=2 is set and the result is determined to be No in the process at step S24, k is updated for k=1 in the process at the next step S25. Therefore, the result is determined to be Yes in the process at the next step S23, and the processing depicted in FIG. 5 is performed, as will be described further below.

At step S27, the image transfer unit 33 determines whether p≧n.

When p is smaller than n, the result is determined to be No at step S27, and the procedure then returns to step S23. That is, with a loop process from steps S23 to S27 being repeated, each transfer magnification rate[p=0 to n−1] of the processes obtained by dividing the reducing process into a plurality of processes is determined. Eventually, the transfer magnification rate[p=n−1] is determined, and then when p=n, the result is determined to be Yes at step S27, and the procedure then goes to step S28.

At step S28, the image transfer unit 33 determines whether S'==1.

When S' is not 1, this indicates that the product of the transfer magnifications rate[p=0] to rate[p=n−1] of the processes obtained by dividing the reducing process into a plurality of processes is not the original transfer magnification X, that is, Relation 2 does not hold and the transfer magnification X is not represented as the product of 1/k. In this case, the result is determined to be No at step S28, and the procedure then goes to step S29 in FIG. 5. That is, the processing depicted in FIG. 5 is performed, which will be described further below.

On the other hand, when S' is 1, this indicates that all of the transfer magnifications rate[p=0] to rate[p=n−1] of the processes obtained by dividing the reducing process into a plurality of processes are 1/k (however, k is not necessarily the same) and the product thereof is the original transfer magnification X. In this case, the result is determined to be Yes at step S28, and the transfer-magnification determining process ends. That is, the process at step S5 in FIG. 3 ends, and the procedure then goes to step S6.

Here, which of the transfer magnifications A, $B_i$, and $C_{n-1}$ is to be associated with each of the transfer magnifications rate[p=0] to rate[p=n−1] in FIG. 4 is not particularly restrictive. For example, in consideration of the amount of memory used and transfer time, a transfer magnification of an earlier reducing process, that is, a transfer magnification near the transfer magnification A and $B_1$, should be decreased. In this manner, any one of the transfer magnifications A, $B_i$, and $C_{n-1}$ should be associated with each of the transfer magnifications rate[p=0] to rate[p=n−1] in FIG. 4.

In other words, a precondition as described below applies to the transfer magnifications rate[i=0] to rate[i=n−2] and rate[n−1] at, for example, step S8 and S11 in FIG. 3. That is, the transfer magnification rate[i=0] corresponds to the transfer magnification A, the transfer magnification rate[i] corresponds to the transfer magnification Bi (where i is an integer from 1 to n−2), and the transfer magnification rate[n−1] corresponds to the transfer magnification $C_{n-1}$. On the other hand, this precondition does not apply to rate[p=0] to rate[p=n−1] in FIG. 4. That is, note that the transfer magnifications rate[p=0] to rate[p=n−1] obtained as a result of the process depicting in FIG. 4 do not necessarily have a one-to-one correspondence with the transfer magnifications rate[i=0] to rate[i=n−2] and rate[n−1] at, for example, step S8 and S11 in FIG. 3.

In the transfer-magnification determining process in FIGS. 4 and 5, the processing depicted in FIG. 4 has been described above. Next, the processing depicted in FIG. 5 is described.

First, a general outline of the processing depicted in FIG. 5 is described.

From the above-described Equation (2), a relation represented by Equation (9) below holds.

$$Y^n \leq X \qquad (9)$$

Also, as with Relation 3 in the processing depicted in FIG. 4, a relation represented by Equation (10) below holds between the positive integer k and the lower limit Y of the transfer magnification of the image processing device 23 (as hardware).

$$Y \leq 1/k \qquad (10)$$

Here, by repeatedly replacing each Y of $Y^n$ on the left part in Equation (9) with 1/k, Equation (11) below is derived in consideration of the relation represented by Equation (10).

$$Y^n \leq Y^{n-1} \times (1/k)^1 \leq Y^{n-2} \times (1/k)^2 \leq \ldots \leq Y^{n-j} \times (1/k)^j \leq (1/k)^n \qquad (11)$$

As represented in Equation (11), by repeatedly replacing each Y of $Y^n$ on the left part in Equation (9) with 1/k, the product increases. At replacement j+1 times (j is an integer equal to or greater than 1), Y exceeds the original transfer magnification X, which is as represented in Equation (12) below.

$$Y^{n-j} \times (1/k)^j \leq X < Y^{n-j-1} \times (1/k)^{j+1} \qquad (12)$$

When the original transfer magnification X is represented as the product of n transfer magnifications, the transfer magnifications included in the product are preferably as close to 1/k as possible. For this, the above-described number of replacements, that is, the number of times j of replacing one Y with 1/k, is preferably as many as possible as long as it satisfies Equation (12). For this, firstly, 1/k is preferably as small as possible, that is, k is preferably as large as possible. Thus, it is assumed that a value represented by Equation (13) below is adopted as a fixed number for k (natural number).

$$k=1/Y \text{ (the fractional part is dropped)} \qquad (13)$$

For example, in the specific example depicted in FIG. 4, the lower limit of transfer magnification is Y=1/3.975. Therefore, in the processing depicted in FIG. 5, k=3 (=1/Y) is adopted as a fixed value.

Also, the above Equation (12) can be transformed as Equation (14) below.

$$Y^{q+1} \times (1/k)^{n-1-q} \leq X < Y^q \times (1/k)^{n-q} \qquad (14)$$

Equation (14) can be further transformed as Equation (15) below.

$$tmp\_dst = S \times Y^{q+1} \times (1/k)^{n-1-q} \leq D < S \times Y^q \times (1/k)^{n-q} \qquad (15)$$

Here, in the processing depicted in FIG. 5, a value q satisfying Equation (15) is calculated (refer to a loop process at steps S30 to S32, which will be described further below).

By using thus found value q, the original transfer magnification X can be represented by Equation (16) below including the product of 1/k (refer to step S33, which will be described further below).

$$X = Y^{q+1} \times (1/k)^{n-2-q} \times W \qquad (16)$$

In Equation (16), W is a value satisfying $Y \leq W < 1/k$.

The processing depicted in FIG. 5 is described step by step in detail below.

At step S29, the image transfer unit 33 sets k=1/Y (the fractional part is dropped), and also sets q=0.

At step S30, the image transfer unit 33 sets $tmp\_dst = S \times Y^{q+1} \times (1/k)^{n-1-q}$.

Here, hardware may be adopted as the image processing device 23 which designates coordinates by integers. In this case, the image transfer unit 33 rounds up the fractional part of the product in each multiplication of $S \times Y^{q+1} \times (1/k)^{n-1-q}$ to obtain an integer, and then sets the integer as tmp_dst.

At step S31, the image transfer unit 33 determines whether $tmp\_dst \leq D$.

When $tmp\_dst \leq D$ does not hold, the result is determined to be No at step S31, and the procedure then goes to step S32. At step S32, the image transfer unit 33 increments q by 1 (q=q+1). The procedure then returns to step S30, repeating the subsequent processes thereafter.

That is, with the loop process from steps S30 to S32 repeating, q is updated so as to satisfy the above Equation (15). When q has a value that satisfies the above Equation (15), the result is determined to be Yes at step S31, and the procedure then goes to step S33.

At step S33, the image transfer unit 33 sets rate[0], . . . , rate[q−1]=Y, rate[q]=D/S×Y$^{-q}$×k$^{n-1-q}$, rate[q+1], . . . , rate[n−1]=1/k. The above-described Equation (16) then holds.

Here, hardware may be adopted as the image processing device 23 that designates coordinates by integers. In this case, the image transfer unit 33 sequentially assigns the transfer magnifications rate[q=0] to rate[q=n−1] set in the process at step S33 in FIG. 5 to the transfer magnifications A, $B_i$ (i=1 to n−2), and $C_{n-1}$ in this order. That is, in this case, the transfer magnifications rate[q=0] to rate[q=n−1] set in the process at step S33 in FIG. 5 have a one-to-one correspondence with the transfer magnifications rate[i=0] to [i=n−2] and rate[n−1] at, for example, step S8 and S11 in FIG. 3.

When such hardware restrictions are not present, which of the transfer magnifications A, $B_i$, and $C_{n-1}$ is to be associated with each of the transfer magnifications rate[q=0] to rate [q=n−1] set in the process at step S33 in FIG. 5 is not restrictive. However, in this case, the transfer magnifications rate [q=0] to rate[q=n−1] set in the process at step S33 in FIG. 5 do not necessarily have a one-to-one correspondence with the transfer magnifications rate[i=0] to [i=n−2] and rate[n−1] at, for example, step S8 and S11 in FIG. 3.

So far, only the reducing process has been described as the embodiments of the present invention. However, as a matter of course, the embodiments of the present invention can be applied to an enlarging process. In this case, the enlarging process can also be performed basically with processes similar to the series of processes described above, except the difference between enlargement and reduction. Specifically, for example, by replacing the variables in the flowcharts of FIGS. 4 and 5 with values below, a transfer-magnification determining process for the enlarging process can be performed.

That is, S is replaced with a transfer-destination size for enlarging process, D is replaced with a transfer-source size for enlarging process, and Y is replaced with {1/{upper limit of transfer magnification for hardware}}.

Also, in the above case, the transfer-magnification determining process is performed after the number of times n the reducing process is performed is previously determined. However, the timing of determining the number of times n is not particularly restricted to the example described above. For example, the number of times n may be determined within a frame of the transfer-magnification determining process.

3. Information Processing System According to Another Embodiment of the Present Invention The information processing system according to the other embodiment of the present invention can adopt a functional structure similar to that of the embodiment described earlier. That is, FIG. 1 also depicts an example of functional structure of the information processing system according to the other embodiment of the present invention.

As described above, some device that can be adopted as the image processing device 23 may perform, for example, a process of reducing pixels, when the transfer magnification is below a specific value (the process is referred to below as a reducing process). In this case, when the reducing process is performed, image quality deteriorates.

Thus, to prevent the reducing process from being performed, the information processing system basically performs operations similar to those in the embodiment described earlier.

However, while the lower limit Y of transfer magnification is referred to in the embodiment described earlier when the reducing process is divided into a plurality of processes, a specific value of transfer magnification causing deterioration in image quality is referred to in the other embodiment. This specific value is represented as Z. The image processing device 23 can then perform the image-data reducing process described with reference to FIG. 2 as it is.

However, it is assumed in Equation (1) that any of the transfer magnifications A, $B_i$, and $C_{n-1}$ is equal to or greater than the specific value Z. That is, in principle, by changing the value Y to the value Z, the image-data transfer process in FIG. 3 onward can be performed.

Effects of the Embodiments of the Present Invention and Others

By adopting the information processing system according to the embodiments of the present invention described above, various effects can be provided. Now, first to third effects are described below as particularly remarkable effects.

The first effect is that an enlarging process at a transfer magnification above the upper limit of hardware and a reducing process at a transfer magnification below the lower limit thereof can be performed.

The second effect is mitigation of deterioration in image quality due to enlargement and reduction. That is, some hardware may perform a reducing process or the like when the transfer magnification at the time of reducing process is below a specific value. When such a reducing process or the like is performed, image quality deteriorates. For example, when a reducing process is performed, a slant line in an image may become jagged, and image quality may deteriorate to a degree that the user can recognize that the slant line, which is supposed to a smooth straight line, is not a straight line. When application software is used in which such image deterioration is critical, by using an embodiment of the present invention, deterioration in image quality can be mitigated without a change of hardware. That is the second effect.

The third effect is a cost reduction in creating hardware. With an increased image resolution in recent years, the occasion of reducing an image of a high resolution at a low transfer magnification tends to arise more often, and this tendency is expected to continue in the future. By applying an embodiment of the present invention, with the first effect described above, it is possible to perform a reducing process at a transfer magnification below the lower limit of hardware. This eliminates a burden of changing hardware at high cost only for supporting increased resolutions. Conversely, it is possible, on purpose, to set a low upper limit of transfer magnification of hardware, set a high lower limit thereof, and also eliminate the function of performing a reducing process or the like on hardware. Thus, it is possible to reduce the memory and bandwidth in hardware and, as a result, a cost reduction in creating hardware can be expected. This is the third effect. When an embodiment of the present invention is applied to middleware, a cost reduction in hardware can be expected without cost of developing application software.

The series of processes described above can be performed not only by hardware but also by software.

In this case, as at least part of the information processing device described above, a personal computer depicted in FIG. 6 may be adopted, for example.

Figure 6:
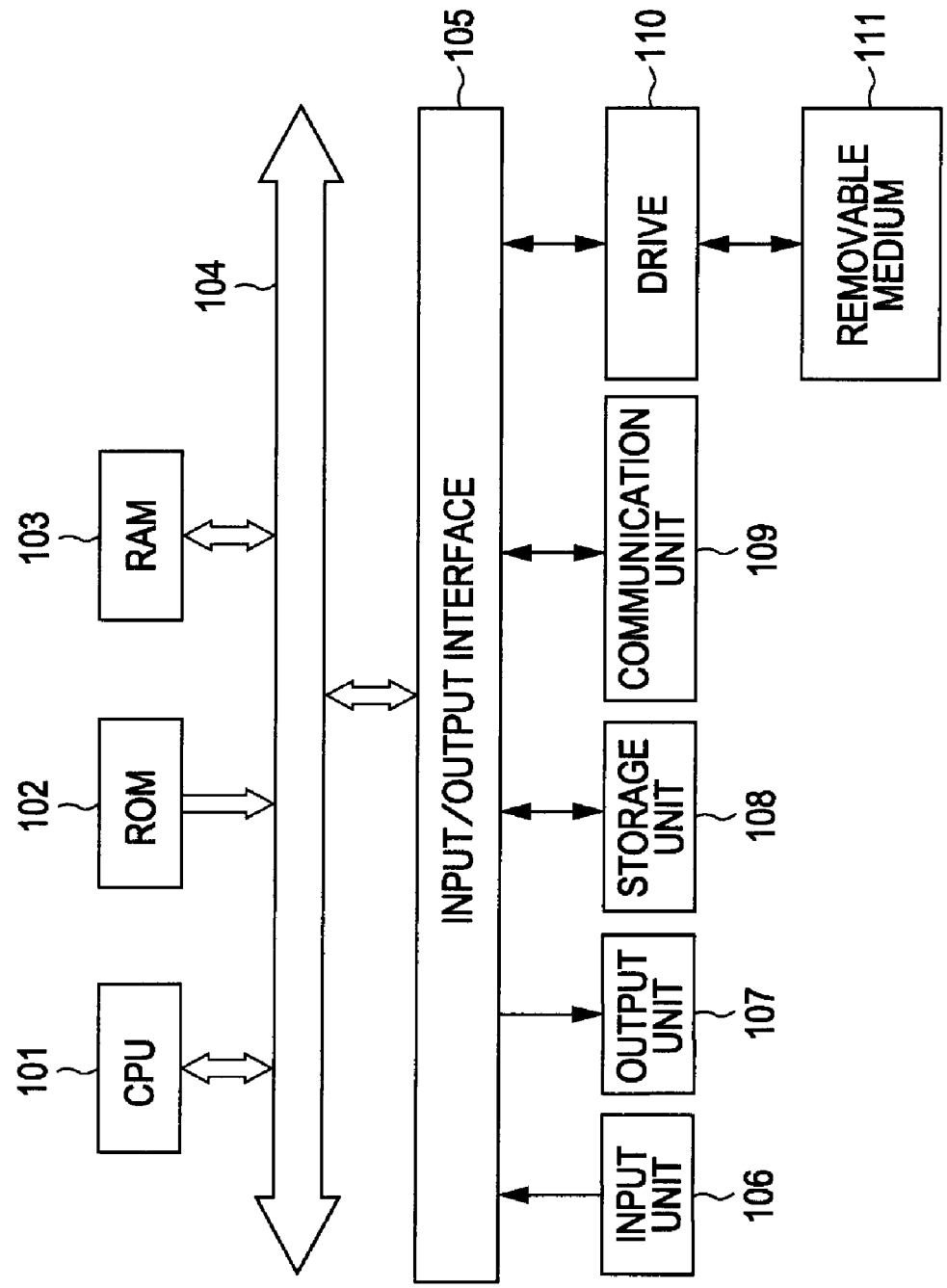
FIG. 6 is a block diagram of an example of the structure of a computer that controls the image processing device according to an embodiment of the present invention.

In FIG. 6, a central processing unit (CPU) 101 performs various processes according to a program recorded on a read only memory (ROM) 102 or a program loaded from a storage unit 108 to a random access memory (RAM) 103. Also, in the RAM 103, for example, data necessary for the CPU 101 to perform various processes is also stored as appropriate.

The CPU 101, the ROM 102, and the RAM 103 are connected to each other via a bus 104. To this bus 104, an input/output interface 105 is also connected.

To the input/output interface 105, an input unit 106 configured of a keyboard, a mouse, and the like, an output unit 107 configured of a display and the like, the storage unit 108 configured of a hard disk and the like, and a communication unit 109 configured of a modem, a terminal adaptor, and the like are connected. The communication unit 109 controls communications with other devices (not shown) via networks including the Internet.

To the input/output interface 105, a drive 110 is also connected as necessary, into which a removable medium 111 configured of a magnetic disk, an optical disk, a magneto-optical disk, or a semiconductor memory is inserted as appropriate. A computer program read from any of these media is installed onto the storage unit 108 as necessary.

When the series of processes is performed by software, a program configuring the software is installed from a network or a recording medium onto a computer incorporated in dedicated hardware or, for example, a general-purpose personal computer, capable of performing various functions by installing various programs.

The recording media containing such programs is configured of not only the removable medium (package medium) 111, as depicted in FIG. 6, which is distributed separately from the main body of the device to provide the programs to users and includes a magnetic disk (including a floppy disk), an optical disk (including a compact disk-read only memory (CD-ROM) and a digital versatile disk (DVD)), a magneto-optical disk (including a mini-disk (MD)), a semiconductor memory, or the like, having the programs recorded thereon. The recording media may also be configured of the ROM 102 having the programs recorded thereon and a hard disk included in the storage unit 108, which are provided to users as being incorporated in advance in the main body.

In the specification, the steps describing a program recorded on the recording medium include not only processes to be sequentially performed in time series but also processes to be performed not necessarily in time series but concurrently or individually.

The present application contains subject matter related to that disclosed in Japanese Priority Patent Application JP 2009-003370 filed in the Japan Patent Office on Jan. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a storage means for storing image data; and
a transfer means for enlarging or reducing the image data stored in a first region of the storage means at a predetermined transfer magnification and transferring the image data to a second region other than the first region of the storage means, wherein
the transfer means enlarges or reduces the image data at the predetermined transfer magnification by performing an enlarging or reducing process on the image data once when the predetermined transfer magnification is within an inclusive range of values between a predetermined upper-limit threshold and a predetermined lower-limit threshold, and
the transfer means enlarges or reduces the image data at the predetermined transfer magnification by repeating, by a plurality of times, a divided-transfer process of performing an enlarging or reducing process on the image data at a divided-transfer magnification that is within the inclusive range of values between the upper-limit threshold and the lower-limit threshold when the predetermined transfer magnification is not within the inclusive range of values between the upper limit threshold and the lower-limit threshold.

2. The image processing device according to claim 1, wherein the transfer means determines a number of times n the divided-transfer process is repeated, n being an integer equal to or greater than 2, and the divided-transfer magnification in the divided-transfer process to be performed for each of the n times, based on the predetermined transfer magnification and the upper-limit threshold or the lower-limit threshold.

3. The image processing device according to claim 2, wherein the transfer means further determines the number of times n the divided-transfer process is repeated and the divided-transfer magnification in the divided-transfer process to be performed for each of the n times, based on properties of hardware of the image processing device.

4. The image processing device according to claim 2, wherein the transfer means further determines the number of times n the divided-transfer process is repeated and the divided-transfer magnification in the divided-transfer process to be performed for each of the n times, based on image quality of an image corresponding to the image data.

5. The image processing device according to claim 2, wherein the transfer means determines the divided-transfer magnification so as to equally distribute the predetermined transfer magnification to the divided-transfer process to be performed for each of the n times.

6. The image processing device according to claim 2, wherein the transfer means determines the divided-transfer magnification of the divided-transfer process to be performed for each of the n times as being equal to 1/natural number.

7. The image processing device according to claim 1, wherein:
the upper-limit threshold is an upper limit of transfer magnification due to restrictions of hardware of the image processing device; and
the lower-limit threshold is a lower limit of transfer magnification due to the restrictions of the hardware of the image processing device.

8. The image processing device according to claim 1, wherein:
the transfer means further performs a process that causes deterioration of an image corresponding to the image data when performing a reducing process at a transfer magnification below a specific value; and
the lower-limit threshold is the specific value.

9. An image processing method for an image processing device including a storage means for storing image data and a transfer means for enlarging or reducing the image data stored in a first region of the storage means at a predetermined transfer magnification and transferring the image data to a second region other than the first region of the storage means, the method comprising the steps of:
storing the image data in the first region of the storage means; and
transferring the image data to the second region of the storage means by enlarging or reducing the image data stored in the first region of the storage means at a predetermined transfer magnification, wherein
the image data is enlarged or reduced at the predetermined transfer magnification by performing an enlarging or reducing process on the image data once when the predetermined transfer magnification is within an inclusive range of values between a predetermined upper-limit threshold and a predetermined lower-limit threshold, and
the image data is enlarged or reduced at the predetermined transfer magnification by repeating, by a plurality of times, a divided-transfer process of performing an enlarging or reducing process on the image data at a divided-transfer magnification that is within the inclusive range of values between the upper-limit threshold and the lower-limit threshold when the predetermined transfer magnification is not within the inclusive range of values between the upper limit threshold and the lower-limit threshold.

10. A non-transitory, computer-readable storage medium storing a computer program that, when executed by a computer controlling an image processing device including a storage means for storing image data and a transfer means for enlarging or reducing the image data stored in a first region of the storage means at a predetermined transfer magnification and transferring the image data to a second region other than the first region of the storage means, causes the computer to perform a control process, the control process comprising:
storing the image data in the first region of the storage means; and
transferring the image data to the second region of the storage means by enlarging or reducing the image data stored in the first region of the storage means at the predetermined transfer magnification, wherein
the image data is enlarged or reduced at the predetermined transfer magnification by performing an enlarging or reducing process on the image data once when the predetermined transfer magnification is within an inclusive range of values between a predetermined upper-limit threshold and a predetermined lower-limit threshold, and
the image data is enlarged or reduced at the predetermined transfer magnification by repeating, by a plurality of times, a divided-transfer process of performing an enlarging or reducing process on the image data at a divided-transfer magnification that is within the inclusive range of values between the upper-limit threshold and the lower-limit threshold when the predetermined transfer magnification is not within the inclusive range of values between the upper limit threshold and the lower-limit threshold.

11. An image processing device comprising:
a storage unit for storing image data; and
a transfer unit for enlarging or reducing the image data stored in a first region of the storage unit at a predetermined transfer magnification and transferring the image data to a second region other than the first region of the storage unit, wherein
the transfer unit enlarges or reduces the image data at the predetermined transfer magnification by performing an enlarging or reducing process on the image data once when the predetermined transfer magnification is within an inclusive range of values between a predetermined upper-limit threshold and a predetermined lower-limit threshold, and
the transfer unit enlarges or reduces the image data at the predetermined transfer magnification by repeating, by a plurality of times, a divided-transfer process of performing an enlarging or reducing process on the image data at a divided-transfer magnification that is within the inclusive range of values between the upper-limit threshold and the lower-limit threshold when the predetermined transfer magnification is not within the inclusive range of values between the upper limit threshold and the lower-limit threshold.

* * * * *